(12) United States Patent
Tate

(10) Patent No.: US 6,582,479 B1
(45) Date of Patent: Jun. 24, 2003

(54) DYE COMPOSITION, DYEING APPARATUS AND DYEING METHOD

(76) Inventor: John E. Tate, 1912 Milan Rd., Greensboro, NC (US) 27410

( * ) Notice: Subject to any disclaimer, the term of this patent is extended or adjusted under 35 U.S.C. 154(b) by 255 days.

(21) Appl. No.: 09/655,089

(22) Filed: Sep. 5, 2000

Related U.S. Application Data

(62) Division of application No. 09/318,064, filed on May 24, 1999, now Pat. No. 6,117,192.

(51) Int. Cl.$^7$ .............................. C09B 67/38; D06P 1/92
(52) U.S. Cl. ............................................. 8/611
(58) Field of Search ............................................. 8/611

(56) References Cited

U.S. PATENT DOCUMENTS

| | | | | |
|---|---|---|---|---|
| 2,416,145 A | * | 2/1947 | Biro | |
| 2,477,768 A | * | 8/1949 | Remer | |
| 2,521,101 A | * | 9/1950 | Thor et al. | |
| 2,668,124 A | * | 2/1954 | Mallabar | |
| 3,170,438 A | * | 2/1965 | Nadler et al. | |
| 3,677,691 A | * | 7/1972 | Koch | |
| 3,811,836 A | * | 5/1974 | d'Albignac et al. | |

OTHER PUBLICATIONS

Kirk–Othmer Encyclopedia of Chemical Technology, 1994 Online posting Dec. 4, 2000 "Glycerol 3. Nomenclature".*

* cited by examiner

*Primary Examiner*—Margaret Einsmann

(57) ABSTRACT

A dye composition of 99.7% pure glycerin and press cake dye is provided along with an apparatus and method of use for the same. The apparatus sets the dye composition into polyester yarns by heating the composition to 160–190° C. and then cooling the composition to 100–140° C. Prescour, dye scour and post scour vessels are provided to facilitate the dyeing process. The fluids used in the apparatus and process are recycled by recycling units.

7 Claims, 3 Drawing Sheets

DYE COMPOSITION, DYEING APPARATUS AND DYEING METHOD

This is a divisional of application Ser. No. 09/318,064 filed May 24, 1999, now U.S. Pat. No. 6,117,192.

BACKGROUND OF THE INVENTION

1. Field of the Invention

This invention pertains to a dye composition, an apparatus, and a method of using the same.

2. Description of the Prior Art and Objectives of the Invention

Many solvent and aqueous compositions and procedures for dyeing yarns, fabrics and other textile structures composed of polyesters, polyamides, polyacrylics and the like have been described over the years as evidenced by U.S. Pat. Nos. Re. 27,773; 3,467,474; 3,518,734; 3,530,214; 3,558,260; 3,770,528; 3,771,949; 3,943,105; 4,047,889; 4,055,971; and 4,115,054. Each of these procedures encompasses limitations however. Some are slow and inefficient; some require special pressure vessel equipment; some require volatile and possibly flammable solvents; some cause air or liquid pollution; some are hard to control sufficiently to assure consistent and uniform product quality; and some are expensive to operate.

One of the hardest fibers or fabric to dye is polyester, even though it is widely used in the industry. Experiments with high boiling point solvents, such as tri-ethylene glycol (TEG) acknowledged that this solvent is excellent for disperse and acid dyes. Removal or separation of the dye from the solvent is also accomplished without difficulty, and the elimination of any crocking tendency is straight forward and efficient. Problems arise however, because traces of TEG are left in the textile structure. These traces contain ether linkages which have a negative effect on light fastness. Likewise, experiments with "pure" dye in press cake form were also unsatisfactory.

Therefore, with the above considerations in mind it is an objective of the present invention to provide a dye composition which does not contain ether linkages.

It is a further objective of the present invention to provide a dye composition which suitably, uniformly dyes polymeric textile structures repeatedly over extended periods of time without the disadvantages of prior dyeing compositions and techniques.

It is yet a further objective of the present invention to provide a dyeing process which uses glycerin and a dye in its press cake form.

It is still a further objective to provide a method for dyeing which operates at a temperature above the melting point for specific dyes, but below their sublimation points.

It is an additional objective to provide a method for dyeing which works with dyes having multiple melting points.

It is another objective to provide a dye composition which contains 99.7% pure glycerin.

It is yet another objective to provide an apparatus which recycles the dye composition.

It is still another objective to provide a dyeing apparatus which directs the textile structure through a flowing dye composition where both the textile structure and the dye composition move at the same rate so as not to stress the textile structure.

It is a further objective to provide a dyeing apparatus which scours the textile structure before and after the textile structure is dyed.

It is still a further objective to provide a dyeing apparatus which recycles and repurifies the water used to scour the textile structure.

It yet a further objective to provide a method for dyeing a textile structure which incorporates elements of the dyeing apparatus and the dye composition.

It is another objective to provide a dyeing apparatus which operates between 160° and 190° C. for the first part of the dyeing step and then operates at a lower temperature for the remaining part of the dyeing step.

These and other objectives and advantages will become readily apparent to those skilled in the art upon reference to the following detailed description and drawings.

SUMMARY OF THE INVENTION

The invention herein pertains to a dyeing composition wherein the composition is made from synthetic glycerin which is greater than 99% pure such as 99.7% pure or greater and a dye, wherein said dye is placed in said glycerin in press cake form, and the resulting composition is then heated to 160° to 190° C. so as to form a dye composition which has a uniform consistency. The dye can be added at various levels depending on the darkness of the dyeing composition desired. The preferred range is 0.1 grams to 4.0 grams of dye per liter of glycerin, with 0.25 grams being best suited for a light dye, 1.1 grams being best suited for a medium dye and 2.0 grams being best suited for a dark dye. The preferred dyes are disperse orange 30, disperse blue 27 and disperse yellow 86. These are sold by a number of companies and are standard within the trade.

This dyeing composition is then used in an apparatus which is well suited to dyeing textile structures such as yarn, threads, fibers, fabric and the like. The preferred apparatus unwinds the textile structure and feeds it into a twenty foot, or 6.1 meter, long prescour vessel by appropriate conventional guide rolls. The prescour vessel is filled with a scouring composition which removes oils, dirt and debris from the textile structure. The textile structure is then fed through a dewatering device and heated by a conventional godet heater for complete drying. While a godet heater is preferred, any comparable electrical induction heater could be used as is well understood. While the above dimensions are suitable for a pilot plant, large scale installations may be two and a half to three times larger as desired.

Thereafter, the textile structure is then fed into a non-pressurized dyeing vessel which is filled with the dye composition described above. The textile structure is moved through the dye vessel in a heated portion for approximately 25 feet or 7.62 meters, and then through a cooler portion of the dye vessel for approximately 5 feet or 1.52 meters. The dye composition flows through the dye vessel at the same rate as the textile structure so that no stresses occur on the textile structure. The textile structure is then passed through a second dewatering device and into an approximately twenty foot dye scour vessel by appropriate guide rolls. Excess dye is cleaned from the textile structure. Next, the textile structure is fed through a third dewatering device and into an approximately twenty foot long post scour vessel where detergents are used to further clean the textile structure. After this cleaning, the textile structure is dewatered a fourth time and is thereafter heated by a conventional godet heater. Lastly, the textile structure, if a yarn, is oiled and wound as is conventional.

In the first section of the prescour vessel, the textile structure is cleaned by counter current flow through a mixture of purified water and a scouring agent such as Henkel Chemical CS-605 and is agitated ultrasonically at a temperature of 90°–95° C. The scoured textile structure is then rinsed in the last section of the prescour vessel by counter current flow through purified water at about 90° C. and continued ultrasonic agitation. The scouring solution is pumped to a receiving tank where it is stored until the water can be purified via usual ultra or hyperfiltration techniques for reuse.

The dye vessel contains the dye composition which has been heated to about 160° to 190° C. The first portion of the dye vessel is jacketed with hot oil or other comparable heat transfer medium so that very uniform temperatures can be achieved. Optional ultrasound agitators may also be used at this stage. The second portion of the dye vessel is also jacketed, but with cooling water so that the dye composition is brought to a temperature of about 100° to 140° C. This "freezes" and sets the dye in the textile structure. The second dewatering device returns any excess dye composition to the dye vessel. The excess dye composition is transported to the dye composition storage tank where it can be sampled, adjusted as required, reheated and recirculated through the process. One of the advantages of the nearly pure glycerin is that it does not change color after repeated heatings and coolings which is a failing common to less pure glycerin. Likewise, no odor is apparent from the ultra pure glycerin use. Both odor and discoloration are undesirable as they affect the ultimate salability of the textile structure.

The dye scour vessel removes any remaining excess dye composition from the textile structure by counter current flow by purified water which has been heated to approximately 90° to 95° C. and ultrasonic agitation. Water from the dye scour vessel is pumped to a receiving tank where it is stored until the water and dye composition can be separated by ultra or hyperfiltration techniques for reuse.

The post scour vessel removes any trace of dye composition that may inadvertently remain on the textile structure, and assures no crocking problems. The first half of the post scour vessel thoroughly cleans the textile structure by counter current flow through a mixture of purified water and a scouring agent such as Henkel Chemical CS-605 at a temperature of 90° to 95° C. and ultrasonic agitation as is desired or required. The second half contains purified water to rinse the textile structure.

The method of using the apparatus follows the nature of the apparatus closely and consists of unwinding the textile material, tensioning it on guide rolls, and cleaning any winding oil in a prescour vessel. The next steps comprise dewatering the textile structure and heating the textile structure prior to introduction into a heated dye vessel where dyeing and cooling occur. The textile structure is then dewatered again and cleaned in the dye scour vessel. The textile structure is dewatered a third time and introduced into a post scour vessel for final cleaning, dewatering and heating prior to oiling the structure if a yarn and rewinding. Also included in the method are the steps of recycling the fluids used to carry out the cleaning and dyeing steps.

DETAILED DESCRIPTION OF THE PREFERRED EMBODIMENTS AND OPERATION OF THE INVENTION

The preferred dyeing composition of the present invention comprises a volume of synthetic glycerin which is at least 99.5% pure, 99.7% or higher being preferred. Added to the glycerin is a conventional pure (undiluted) dye powder commonly called "press cake." Acceptable dyes include disperse orange 30, and disperse blue 27 as sold by Crompton & Knowles under the names Intrasil Brown 2RFL and Intrasil Blue GLF respectively and disperse yellow 86 as sold by Ciby Geigy under the name Terasil Yellow 2R. At least 0.1 gram of dye is added per liter of glycerin. No more than about 4.0 grams of dye per liter of glycerin should be needed for most dyeing jobs, although greater concentrations of dye are certainly possible, but not preferred. For a light colored dye, the preferred amount is 0.25 grams of dye per liter of glycerin. For a medium colored dye, the preferred amount is 1.1 grams of dye per liter of glycerin. For a dark dye, 2.0 grams of dye per liter of glycerin are preferred.

Since 99.7% pure glycerin has a distinct partial pressure, i.e.–20 mm Hg, at 180° C. it is possible to set surface area so that volatilization rate of dispersant will be the same as the consumption rate of dye (dispersant/dye ratio), thus keeping the concentration constant. For example, based on lab evaporation rate data a production machine for 200 ends, 150 denier polyester, 200 meters per minute would require a surface area of 300 square feet for balance. For a 75' (22.8 m) long dye bath, 4' (1.21 m) wide would be required which is not unreasonable.

Figure 1:
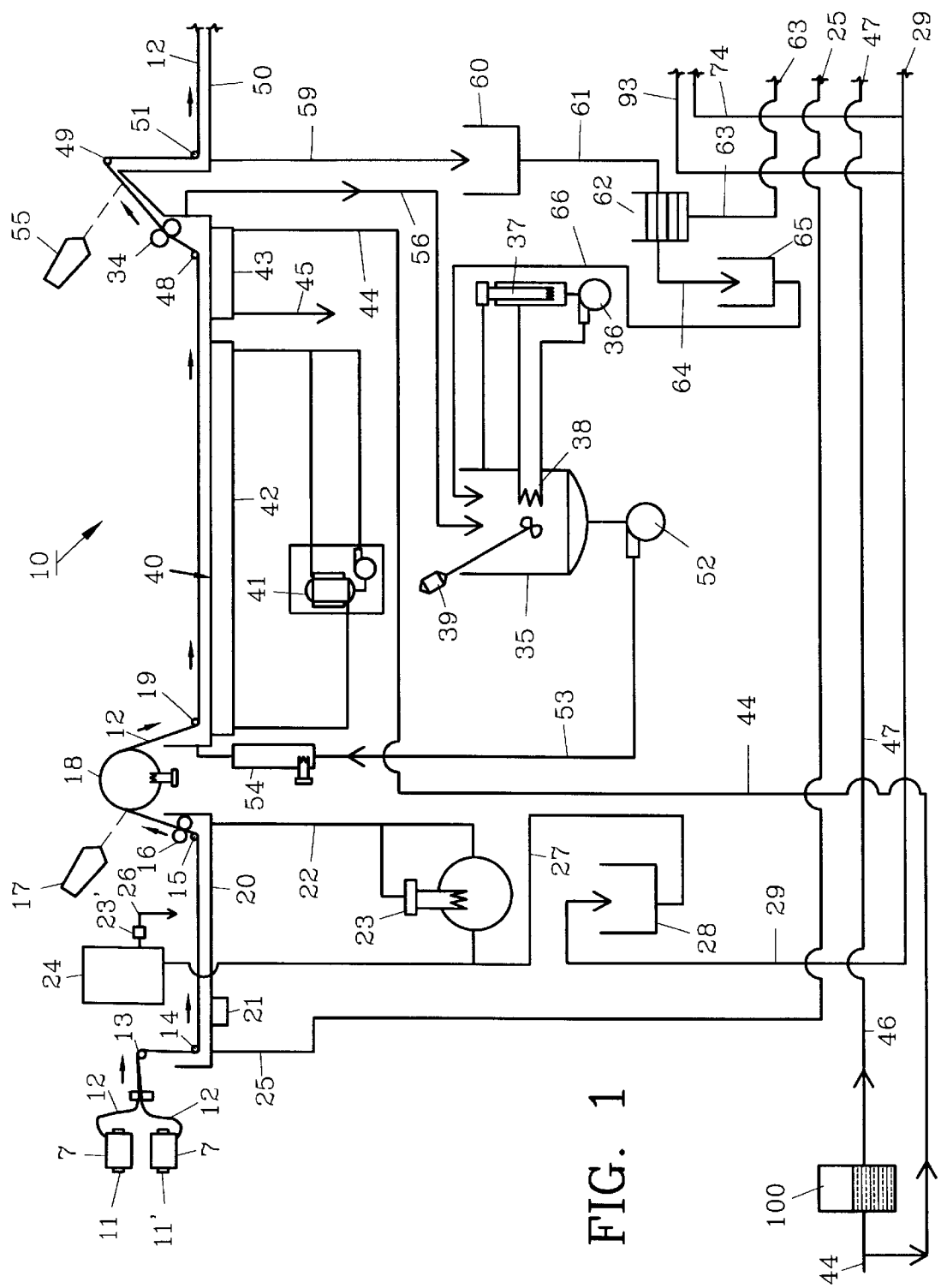
FIG. 1 shows a partial schematic view of the preferred apparatus of the present invention.
Figure 2:
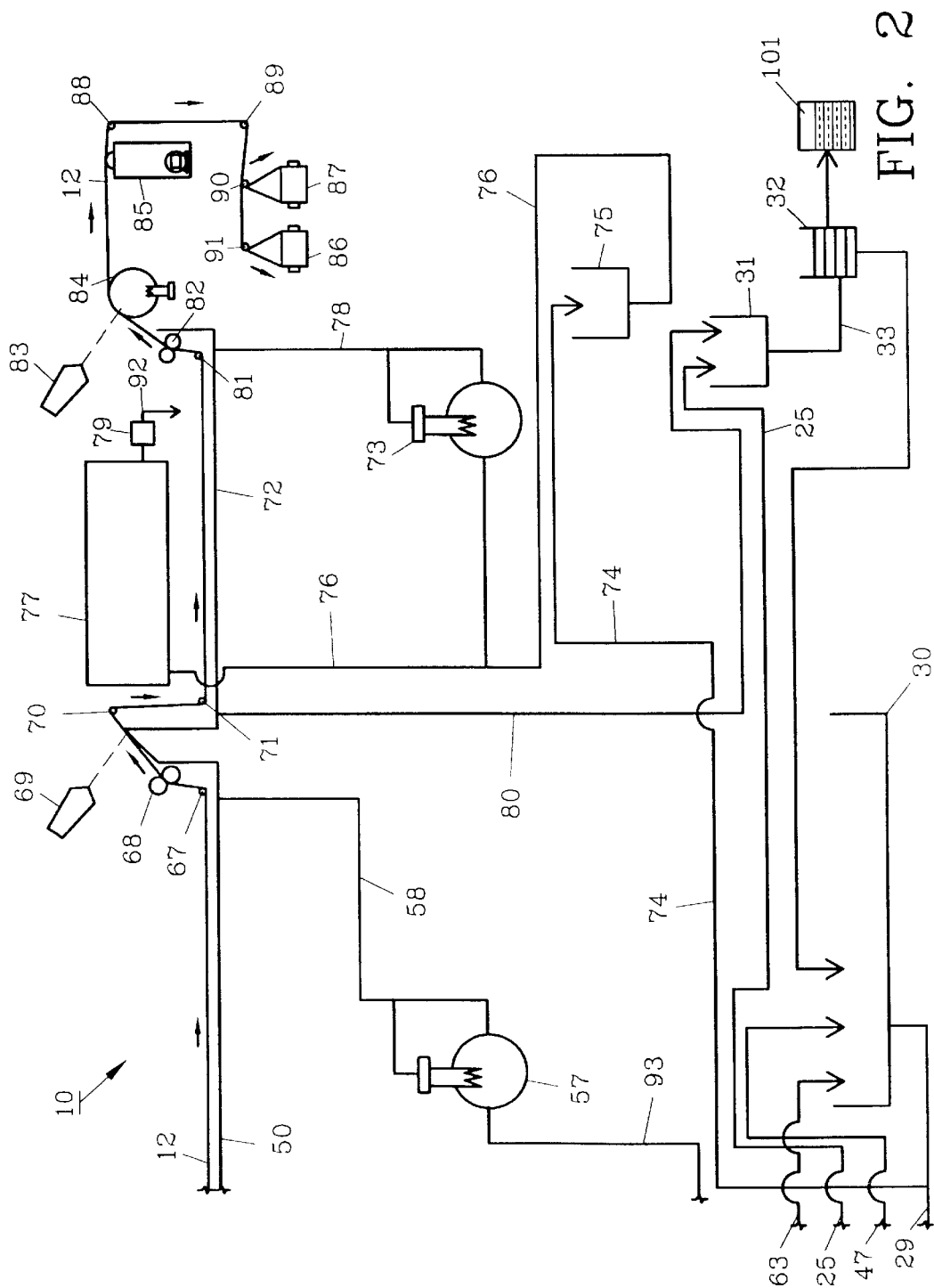
FIG. 2 pictures the second part of the schematic begun in FIG. 1.
Figure 3:
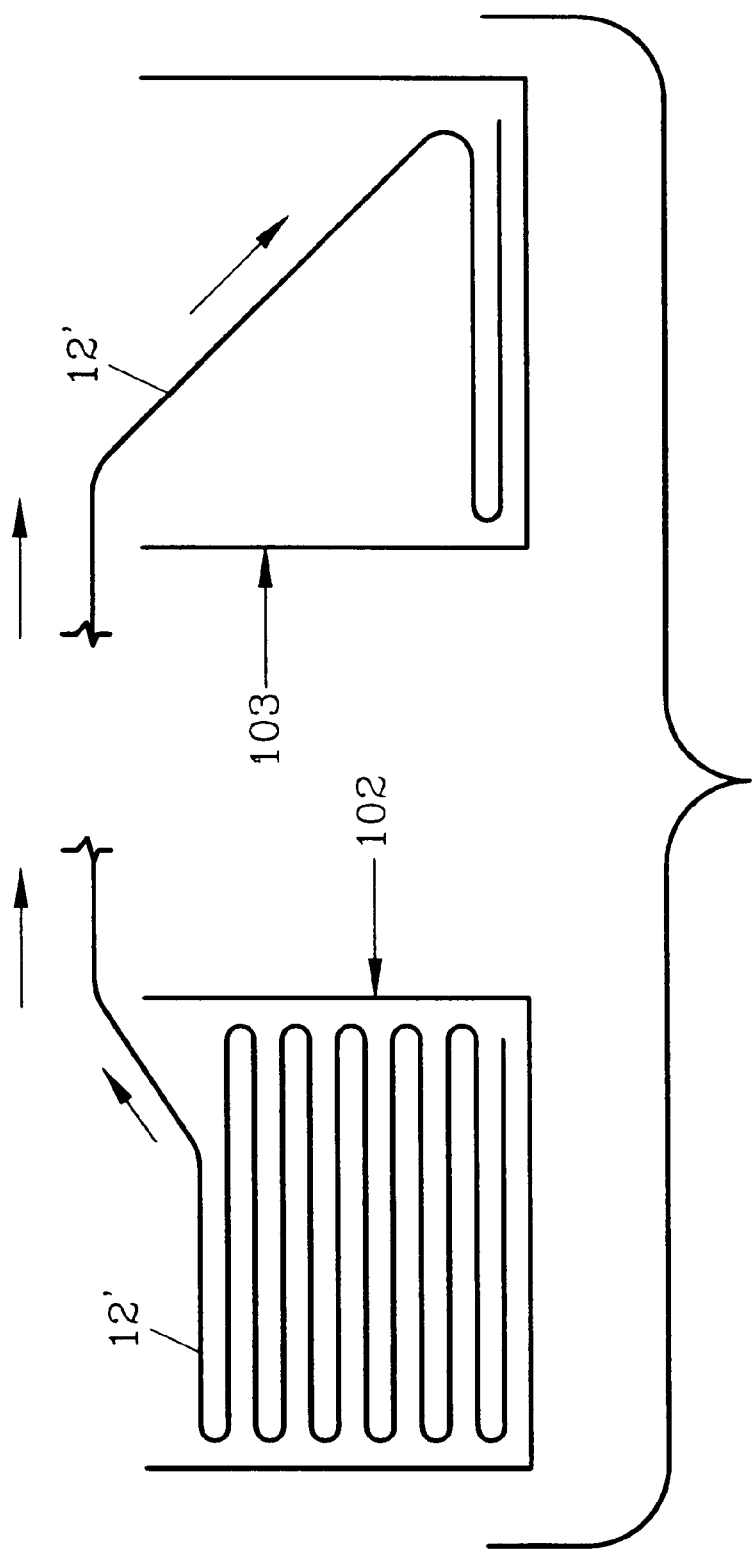
FIG. 3 shows enlarged schematic tow dyed yarn boxes with yarn which may be substituted for the creels in FIGS. 1 and 2.

Turning now to the drawing, FIGS. 1 and 2 show a schematic view of preferred dyeing apparatus 10. Apparatus 10 includes standard creels 11 and 11' which hold spools 7 of textile structure 12. In the event tow dyed yarns 12' are processed, boxes for such yarns are shown in FIG. 3 for supplying and receiving tow dyed yarns. Such tow dyed yarn may contain 100,000 or more ends as is conventional. Textile structure 12 could include various yarns, fabrics, fibers or other comparable materials, but is preferably polyester yarn. Textile structure 12 passes around first guide roll 13 and then is directed by second guide roll 14 into prescour vessel 20.

Prescour vessel 20 is contiguous to ultrasonic agitator 21, and prescour vessel 20 is preferably twenty feet (6.1 m) long. Ultrasonic agitator 21 is a conventional horn agitator such as is commonly found in the industry, although other comparable devices are contemplated. In the first half of prescour vessel 20, textile structure 12 is cleaned by counter current flow through a mixture of purified water and a scouring agent such as Henkel Chemical CS-605 and is agitated ultrasonically by ultrasonic agitator 21. Textile structure 12 is then rinsed in the last half of prescour vessel 20 by counter current flow through purified water at about 90° C. and continued ultrasonic agitation. This is accomplished by pumping purified water into the distal end of prescour vessel 20 through pipe 22 and draining prescour vessel 20 at the proximal end through pipe 25. At the midpoint of prescour vessel 20, a scouring agent is introduced the scouring mixture is formed. The purified water is heated to approximate 90° C. by heater 23. The scouring agent is heated to approximately 90–95° C. by heater 23' prior to its introduction into prescour vessel 20. The scouring agent is normally contained in scour agent vessel 24 and fed into prescour vessel 20 by pipe 26. This step cleans textile structure 12 of any winding oil, random fibers or other unwanted debris that may have inadvertently contacted textile structure 12.

The purified water reaches heater 23 by pipe 27 which connects water tank 28 to heater 23. Water tank 28 is fed by pipe 29 from purified water storage tank 30 (FIG. 2). Water tank 30 is originally fed by water purifier 100 (FIG. 1). After draining, the prescour mixture is preferably drained by pipe 25 into waste tank 31 which drains into high efficiency filter 32 via pipe 33. Filters which separate liquid molecules by molecular weight in addition to screening solid particles are suitable and many are commercially available which meet this criteria. Purified water discharged from high efficiency filter 32 feeds into tank 30 for reuse. Byproducts of filter 32 are incinerated in incinerator 101 as is conventional. While pipe 25 could feed into a sewer line (not shown) such is not preferred because it may cause pollution problems and the like. Note that conventional pumps (not shown) may be used to accelerate the movement of these fluids around as needed, or the pipes could be gravity drained, but in any event some pumps would be required.

Textile structure 12 is guided from prescour vessel 20 by third guide roll 15 and, conventional nip rolls 16 and dewatering device 17 and heated godet 18. The nip rolls of the present invention are conventional rolls where one roll is steel and the other roll is neoprene such as are commonly found in the industry. Dewatering device 17 can be an air knife, air blower, press rolls or other suitable, comparable dewatering device. Most moisture is removed from textile structure 12 except that needed for static control and allows fourth guide roll 19 to guide textile structure 12 into dye vessel 40.

Dye vessel 40 contains the dye composition described above. Dye vessel 40 also comprises hot jacket 42 which is preferably a hot oil jacket which raises the temperature of the dye composition to approximately 160° to 190° C. Hot jacket 42 is followed by cooling jacket 43 which lowers the temperature of the dye composition to approximately 100° to 140° C. This cooler temperature sets or fixes the dye in textile structure 12. Recirculating pump and heater 41 maintain the oil at the desired temperature and constantly circulate the oil so that it does not cool beyond the desired parameters. Cooling jacket 43 is fed by domestic water pipe 44, and drains to a conventional sewer line (not shown) by pipe 45. Domestic water pipe 46 is a branch of domestic water pipe 44 which receives non-purified municipal water or the like as is conventional. Pipe 47 also branches from domestic water pipe 46 and feeds purified water storage tank 30 via conventional water purifier 100. Fifth and sixth guide rolls 48 and 49 respectively, along with nip rolls 34 lift textile structure 12 out of dye vessel 40 where it is dewatered by dewatering element 55 and then sent into dye scour vessel 50 with the assistance of seventh guide roll 51. Textile structure 12 travels approximately 25 feet or 7.62 m through hot jacket 42 and then through cooling jacket 43 for approximately 5 feet or 1.52 m.

The dye composition is mixed and held in dye composition tank 35 which includes recirculating pump 36 and heater 37 to keep the dye composition uniformly heated in tank 35. Additional heater 38 and mixer 39 directly stir and heat the dye composition while in tank 35. Pump 52 pumps the dye composition through pipe 53 to heater 54 and into dye vessel 40, where the dye composition moves along with textile structure 12 at the same rate so no stresses occur in textile structure 12. The synthetic, pure glycerin of the dye composition allows it to be reheated repeatedly without discoloration or odor occurrence. Tank 35 is open to allow adjustments to be made to the concentration of the dye, or any other adjustments that need to be made.

Excess dye composition is blown back into dye vessel 40 for draining by dewatering device 55 as is well understood in the art. Dye vessel 40 is drained by pipe 56 which feeds the dye composition back into dye tank 35 for reheating, concentration adjustments or other desired adjustments.

Dye scour vessel 50 is approximately twenty feet long and contains purified water. The water is heated to approximately 90–95° C. by heater 57 and fed into dye scour vessel 50 by pipe 58. Purified water from tank 30 comes via pipe 29 and then pipe 93 to heater 57. The water rinses textile structure 12 through counter current flow and ultrasonic agitation as needed. Thus, while not shown, an additional ultrasonic agitator could be contiguous with dye scour vessel 50. Eighth guide roll 67, nip rolls 68, dewatering device 69 and ninth guide roll 70 help lift textile structure 12 out of dye scour vessel 50. Dye scour vessel 50 is drained by pipe 59. Thus, water flows from the distal end of dye scour vessel 50 to the proximal end in order to give the desired counter current flow.

Dye scour vessel 50 is drained by pipe 59 which feeds into tank 60. Tank 60 drains by pipe 61 to high efficiency filter 62. Filter 62 sends any water extracted to purified water storage tank 30 by pipe 63 for reuse. Any glycerin or dye is fed into tank 65 by pipe 64. Tank 64 feeds into dye tank 35 by pipe 66 for additional recycling of the dye and glycerin.

Ninth guide roll 70 and tenth guide roll 71 direct textile structure 12 into post scour vessel 72 which is substantially identical to prescour vessel 20. Post scour vessel 72 is approximately twenty feet long and contains purified water and a scouring agent such as Henkel Chemical GS-605 for the first half. The second half contains only purified water to rinse textile structure 12. Both the water and the scouring agent cleanse textile structure 12 through counter current flow and additional ultrasonic agitation as required by an ultrasonic agitator (not shown). This step removes all final traces of extra dye composition.

Purified water from storage tank 30 enters pipe 74 which feeds into holding tank 75 and thence into pipe 76 which branches to heater 73 and scouring agent tank 77. Heater 73 heats the water to approximately 90° C. prior to its introduction into post scour vessel 72 by pipe 78. Scouring agent tank 77 contains a scouring agent such as mentioned above and mixes the scouring agent with the purified water. The scouring mixture is heated by heater 79 to approximately 90–95° C. and fed into post scour vessel 72 by pipe 92 at the approximate midpoint of post scour vessel 72. Drainage from post scour vessel 72 is accomplished by pipe 80 which feeds into tank 31 and then into filter 32 by pipe 33 as described above.

Guide roll 81, nip rolls 82 and dewatering device 83 lift textile structure 12 from post scour vessel 72 and remove excess moisture from textile structure 12. Godet heater 84 removes any final excess moisture except that needed for static control.

Oiler 85 lubricates textile structure 12 for winding by usual cop winders 86 and 87. As would be understood additional guide rolls 88–91 help properly position textile structure 12 as needed. The entire process described takes only 30 seconds for a particular section of textile structure to be unwound, washed, dyed, washed and wound again. Apparatus 10 maintains textile structure 12 under tension from first godet roll 18 to final godet roll 84.

The preferred method of dyeing textile structure 12 comprises unwinding textile structure 12 from spools 7, and feeding textile structure 12 into prescour vessel 20. Textile structure 12 is then cleaned of any foreign matter that may be present. Textile structure 12 is then dried by dewatering device 17 and godet heater 18. After drying, textile structure is fed into dye vessel 42 for dyeing in the heated dye portion created by hot jacket 42 and setting in cooling jacket 43. After dyeing, the excess dye is removed through dewatering device 55. The next step comprises bathing textile structure 12 in dye scour vessel 50 and post scour vessel 72. After drying textile structure 12 once more and oiling it, textile structure 12 is wound and ready to be moved to its final destination. As noted above, the entire process takes approximately only 30 seconds. The preferred dyeing temperature is at least 60° C. above the second order transition temperature of the yarn or other object being dyed. The second order transition temperature of polyester yarn is 72° C. Dyeing experiments below 132° C. for polyester yarn have not proven commercially successful.

FIG. 3 shows tow dyed yarn box 102 which can be used to feed apparatus 10 in place of creels 11 and 11' and, after processing yarn 12' may be collected in box 103 instead of being wound on creels 86 and 87.

The preceding recitation is provided as an example of the preferred embodiment and is not meant to limit the nature or scope of the present invention.

I claim:

1. A composition for dyeing a textile structure, said composition comprising: glycerin, said glycerin being greater than 99% pure and a dye, said dye comprising between 0.1 gram and 4.0 grams of dye per liter of glycerine.

2. The composition of claim 1 wherein said glycerin is 99.5%–99.7% pure.

3. The composition of claim 1 wherein said glycerin is greater than 99.5% pure.

4. The composition of claim 1 wherein said glycerin is greater than 99.7% pure.

5. The composition of claim 1 wherein said dye comprises 0.25 grams of dye per liter of glycerin.

6. The composition of claim 1 wherein said dye comprises 1.1 grams of dye per liter of glycerin.

7. The composition of claim 1 wherein said dye comprises 2 grams of dye per liter of glycerin.

* * * * *